3,695,831
ABSORPTIVE SODA ASH
David Goldstein, East Brunswick, N.J., assignor to
FMC Corporation, New York, N.Y.
No Drawing. Filed Oct. 30, 1970, Ser. No. 85,778
Int. Cl. C01d 7/14
U.S. Cl. 423—189
8 Claims

ABSTRACT OF THE DISCLOSURE

A low bulk density, highly absorptive soda ash, suitable for use in detergent formulations, is produced by agglomerating fine soda ash particles with water, carbonating the resulting wet sodium carbonate monohydrate to produce predominantly sodium sesquicarbonate, and calcining the resulting carbonated mixture to soda ash.

BACKGROUND OF THE INVENTION

(A) Field of the invention

The invention relates to a process of producing soda ash having a low bulk density, good flowability, high absorptivity for surfactants, and suitable for use in dry detergent formulations.

(B) Description of the prior art

The need for an effective process to manufacture a highly absorptive, light bulk density soda ash is well known in the art. Some have attempted to meet this need by calcining crude sodium bicarbonate, also termed "ammonia-soda" crystals to 100–250° C., but have not obtained a commercially acceptable product. Others mix hydrated sodium carbonate and sodium bicarbonate and rapidly heat the mixture to produce a low bulk density product, i.e. 25 to 45 lbs./cu. ft.; the process is described in U.S. Pat. 3,188,170 issued to Mantz et al. on June 8, 1965. Another procedure for treating dry alkali metal carbonate particles to form acceptable products is described in U.S. Pat. 3,334,963 issued on Aug. 8, 1967, in which an alkali metal carbonate is reacted with an aqueous alkali metal hydroxide and then calcined to soda ash.

These procedures have not satisfied all requirements for a readily workable, commercial process. In many cases they require preparation of separate feeds which must be mixed and reacted in given proportions to obtain the desired products. Further, many of the products of these reactions are weak and break down readily into fines (highly frangible) upon being conveyed in an air stream or on further handling. Accordingly, there is a need for a more rapid, easily workable process capable of supplying commercial quantities of a stronger product.

SUMMARY OF THE INVENTION

The present invention is carried out by contacting particles of sodium carbonate, sodium carbonate monohydrate or mixtures thereof with an aqueous medium, agglomerating the resulting mixture at temperatures of about 35 to 109° C., to yield wet agglomerates containing 20 to 28% by weight of water, reacting the wet agglomerates with carbon dioxide gas in amounts sufficient to obtain carbonated agglomerates containing essentially sodium sesquicarbonate alone or mixed with sodium carbonate monohydrate or sodium bicarbonate, and having a mole ratio of $NaHCO_3:Na_2CO_3$ of about 0.4:1 to about 2:1 (and preferably 0.7:1 to 1:1), calcining the carbonated agglomerates to soda ash and recovering a free flowing, highly absorptive soda ash, having a density of below 40 (and preferably 28 to 35) lbs. per cubic foot.

DESCRIPTION OF THE INVENTION AND THE PREFERRED EMBODIMENTS

In carrying out the present invention, the feed which is utilized can be fine particles containing either sodium carbonate monohydrate, anhydrous sodium carbonate or mixtures of these components. A preferred feed is the dust by-product which is obtained during the calcination of either sodium sesquicarbonate, sodium carbonate monohydrate or other precursor salts which are heated to form soda ash. The size of the feed particles utilized in the process preferably are fines, that is, fine particles whose major proportion is less than 100 mesh. Typical soda ash fines may have a size of 100% minus 20 mesh, 95% minus 60 mesh, 75 to 85% minus 80 mesh and 60 to 80% minus 100 mesh.

These fines are placed in a rotary drum or pan granulator and sprayed with an aqueous medium which may be simply water or an aqueous solution containing sodium cations and either carbonate and/or bicarbonate ions. The temperature of the water and granules is maintained within the range of 35 to 109° C.; these temperatures result in the production of sodium carbonate monohydrate and avoid the higher hydrates of sodium carbonate such as the heptahydrate or decahydrate. These latter hydrates are undesirable in the present process since they produce very weak granular products.

The granules are agglomerated in the rotary drum or pan granulator into wet agglomerates, essentially having a size of −20 plus 100 mesh. Agglomeration of the fines commences to occur after sufficient water has been sprayed on the fines to convert the fines substantially to sodium carbonate monohydrate; sodium carbonatae monohydrate contains 14.5% water. Additional water is sprayed on the agglomerates until a wet agglomerated product is obtained that contatins from 20 to 28% by weight total water. The granular wet agglomerates of the desired size has a final water content of from 23 to 25% by weight total water; this constitutes about 76 to 100% in excess of the water required to form sodium carbonate monohydrate. If less water is used than the amount set forth above, an increase in the number of undersized particles is obtained from the agglomerator spill; if more water is utilized than the amount set forth above, oversized agglomerates are produced, that is, an excessive amount of particles larger than +20 mesh.

The resulting wet agglomerates are reacted with carbon dioxide gas to convert at least a portion of the sodium carbonate monohydrate to sodium sesquicarbonate. The reaction takes place in accordance with the following equation.

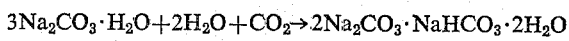

In the event that some soda ash is present which has not been hydrated to the monohydrate, the reaction of the soda ash takes place according to the following equation.

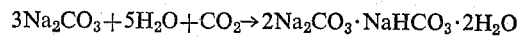

The reaction of the carbon dioxide and the wet agglomerates can be carried out in any solid gas treating apparatus such as a fludized bed, a rotary kiln, a rotary tube with flights or the like. The reaction may be permitted to take place at temperatures of from 35 to 109° C. although temperatures of 35° to 90° C. are preferred. Further it is desirable to maintain the partial pressure of the $CO_2$ in reactor as high as possible, e.g. 0.5 to 1 atmosphere, to obtain and maintain a rapid reaction rate between the $CO_2$ and the wet agglomerates.

During the carbonation of the wet agglomerates, the reaction is exothermic and large quantities of heat are evolved which can raise the temperature of the carbonated agglomerates. Accordingly it is desirable to utilize some heat exchange equipment in order to avoid raising the temperature of the carbonated agglomerates above 90° C. Above this temperature, carbonation proceeds at a much slower rate and reduces the efficiency of the carbonation stage.

The carbonation of the wet agglomerates may be carried out until all of the sodium carbonate has been converted to sodium sesquicarbonate. Further, carbonation may be carried out to convert a portion of the sodium sesquicarbonate to sodium bicarbonate according to the following equation.

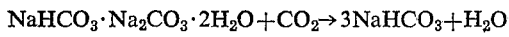

$$NaHCO_3 \cdot Na_2CO_3 \cdot 2H_2O + CO_2 \rightarrow 3NaHCO_3 + H_2O$$

Carbon dioxide is reacted with the wet agglomerates until the mole ratio of sodium bicarbonate:sodium carbonate has reached from 0.4:1 to 2:1. In computing this ratio, all sodium bicarbonate values and all sodium carbonate values, no matter what form they are in, e.g. as sodium sesquicarbonate or sodium carbonate monohydrate, are utilized in determining the formulation. The extent of carbonation should be limited so that the final carbonated agglomerates do not exceed a mole ratio of $NaHCO_3/Na_2CO_3$ of 2:1. Carbonation beyond this ratio, up to essentially sodium bicarbonate, can be readily achieved but is undesired in the present invention since it leads to a final soda ash product which is undesirably weak and frangible.

In carrying out the above carbonation step, it is essential that the wet agglomerates which are to be carbonated contain excess water beyond that sufficient to produce the sodium carbonate monohydrate; that is, the agglomerates must be wet and contain from 20 to 28% total water. This amount of water is sufficient to form the sodium carbonate monohydrate plus free water. Surprisingly, the free water permits the carbonation reaction to proceed quickly and effectively. It has been found that if the carbonation is attempted without this free water, the reaction does not take place to any appreciable extent. Accordingly, the inclusion of free water during the carbonation of the carbonate monohydrate agglomerates is an essential feature of the present invention.

The resulting carbonated agglomerates are then screened to remove the —20 mesh fraction. This is fed to a calciner where the —20 mesh agglomerates are calcined until an anhydrous soda ash product is obtained. Suitable calcining temperatures are from 100 to 250° C. The calcination can be carried out in any suitable form of equipment such as a rotary kiln, a fluidized reactor or the like. During this calcining operation both carbon dioxide and water vapor are evolved and anhydrous soda ash is recovered as the product. The screened +20 mesh fraction removed from the carbonator is ground and returned to the screen to yield additional —20 mesh particles. In addition, lines which are removed from the calciner may be recycled back to the agglomerator for further processing and greater efficiency.

The resulting particles of soda ash has been found to be exceptionally suitable for use in formulating dry detergent formulations because they are strong (low frangibility) and because they have greater absorptivity for surfactants than conventional soda ash. The absorptivity is the ability of the soda ash to absorb a standard surfactant while remaining flowable and without exuding any of the surfactant onto an absorbent surface. The absorptivity test is conducted by mixing 500 g. of a soda ash sample in a Hobart mixer with 25 ml. increments of Triton X–100 (isooctyl phenyl polyethoxyethanol) liquid surfactant from a burette. After the addition of each increment of liquid surfactant, mixing is continued for a period of three minutes. The mixing is stopped after this period and a small sample is placed in a 4-dram vial. The vial is rotated and visually observed for flowability (or clumping) and sticking to the vial's surface. The results are reported in terms of the percent by weight of Triton X–100 which can be absorbed in the granules before flowability becomes imparied.

A verification of the absorptivity can also be obtained by placing the sample on a No. 40 Whatman filter paper and pressing the sample on the paper. If no specks of surfactant appear after allowing the sample to stand on the paper for two hours, then no run off of the surfactant has occurred. For example if the absorptivity of a sample is 25–30%, then samples of the soda ash will absorb at least 25% by weight of the initial sample of surfactant and will not speck a Whatman filter paper with that amount of surfactant; at higher levels of surfactant, i.e. 30% by weight of the initial sample, specks will show up on the filter paper and the flowability of the sample will be impaired when tested in a vial. Therefore, the absorptivity lies somewhere between 25 and 30%.

Another important property of the instant soda ash product is that its frangibility is very low. The frangibility is determined by taking a sample of over 100 g. of the 20–100 mesh granules of soda ash and screening them for five minutes on a 100 mesh screen in a Ro-tap machine to remove any —100 mesh dust particles adhering to the granules. Thereafter 100 g. of the screened material is rescreened on the Ro-tap for fifteen minutes on a 100 mesh screen containing three 1⅜ inch diameter gum rubber balls, each weighing between 25–29 g. The —100 mesh material from this test is reported as the percent breakdown or frangibility.

The present soda ash product also has a high porosity and most importantly has substantial pore volumes greater than 1 micron; this is believed to account for its high absorptivity. The porosity and pore size distribution of the soda ash product is determined by measuring the volume of sample that is penetrable by mercury when the pressure is increased from 1.8–5,000 p.s.i. absolute.

The porosity of a sample can be determined readily using an Aminco-Winslow Porosimeter, manufactured by the American Instrument Company, Incorporated, of Silver Spring, Md., which is designed to permit pressures of up to 5,000 p.s.i. absolute to be exerted on mercury used to penetrate the pores. In using this technique, the sample is initially subjected to mercury under a pressure of 1.8 p.s.i. absolute. At this pressure, the mercury penetrates all voids and surface cracks which are larger than 100 microns. As the pressure on the mercury is increased, up to 5,000 p.s.i. absolute, the mercury penetrates increasingly smaller pores in the sample. The cumulative volume of mercury which penetrates the sample at a given pressure is then recorded at pressures up to 5,000 p.s.i. absolute. The pressure necessary to penetrate pores of a given diameter is known and the volume penetration can be plotted against pore size (diameter). In this way, the volume of the pores corresponding to any given pore size can be determined for a sample.

In the case of the present product, the pore volume is relatively high on the order of 35 to 65% and the pore volume greater than 1 micron in diameter (1 to 10 micron range) is 35 to 60% of the pore volume. The remaining 40 to 65% of the pores are found to be in the 0.2 to 1.0 micron range.

Soda ash fines which are useful as the feed material for the present invention can readily be obtained from the process of producing soda ash set forth in U.S. Pat. 3,028,215 issued to Frint on Apr. 3, 1962. In this patented process the soda ash is produced by calcining a sodium sesquicarbonate. During the calcination substantial amounts of fines are removed from the kiln with the exhaust gases and are recovered in a separator from the gases. These fines are substantially calcined soda ash with traces of sodium sesquicarbonate and precursor carbonates and have been found to be most suitable for use as the feed in the present invention. In some instances conventional soda ash product produced by the above patented process or by other known methods use more than one calcination stage. The soda ash fines which are unavoidably carried off with the exhaust gases during either calcining stage is suitable for use as feed material in the present invention. Since these fines normally constitute an undesired fraction of the soda ash product, the present process is highly advantageous in that it turns these soda ash fines into a more valuable form of soda ash which is highly desired in the art.

The following examples are given to illustrate the invention but are not deemed to be limited thereof.

EXAMPLE 1

Soda ash calciner fines recovered from the process for producing soda ash set forth in U.S. Pat. 3,028,215 issued to Frint on Apr. 3, 1962 were used as the feed in the following example. The screen analysis of the feed was as follows:

| Mesh: | Percent by wt. retained on screen |
|---|---|
| +20 | 0 |
| +60 | 5–8 |
| +80 | 14–25 |
| +100 | 18–42 |
| −100 | 58–82 |

The soda ash fines were preheated and fed through a screw feeder onto a 14-inch Dravo-Lurgi pelletizing disk at a rate of 44 lbs./hour; the pelletizing disk angle was 45° and rotated at 33 r.p.m. Preheated water, at 50 to 60° C., was sprayed into the bed through an atomizing spray nozzle and the bed temperature on the disk maintained at 55 to 65° C. The flow rate of water was maintained such that the wet agglomerated fines contained 24–25% total water. This amount of water was sufficient to theoretically convert all the soda ash to sodium carbonate monohydrate and to maintain free water in the agglomerates. The wet agglomerates from the disk flowed by gravity into a rotating tube, 7 ft. long and having a 6½-inch I.D., which served as a rotating carbonator. The carbonator had a slope of 0.25 inch/foot and rotated at 38 r.p.m. Flights were present in the rotating tube to shower the wet agglomerates and provide sufficient exposed surface area to incoming carbon dioxide. A 1-inch dam was located at the discharge end of the carbonator. Carbon dioxide was metered into the carbonator at the discharge end, countercurrent to the flow of the wet agglomerates, at a flow rate of 0.9–1.1 c.f.m. and at a temperature of 25° C. A sealed housing was located at the discharge end of the rotating carbonator to minimize air leakage; under these conditions the partial pressure of $CO_2$ was 1 atmosphere. A rotary air-lock valve discharged the final product at about 70° C. into a vibrating screen which continuously screened oversized carbonated material (+20 mesh) from the desired product (−20 mesh). A total of 2,963 lbs. of −20 mesh carbonated agglomerates were produced in this manner. The oversize (+20 mesh) material amounted to 268 lbs. or 8.3% by weight of the total carbonated agglomerates produced. This oversized material may be crushed and fed to a calciner, as described hereinafter, with the −20 mesh particles. The −20 mesh carbonated agglomerates were then fed to an 18-inch diameter fluid bed calciner at a rate of about 136 lbs./hour by means of a screw feeder and a bucket elevator. Combustion gases at 500° C. were passed through the fluid bed calciner and used to calcine the carbonated agglomerates to the soda ash product. The fluid bed temperature was 110–130° C. and the superficial gas velocity through the bed was 0.9 feet/second. Overhead there was removed a total of 5.6% of fines (−100 mesh) of the total soda ash fed to the agglomerating disk. A total of 2,062 lbs. of absorptive soda ash were produced. The properties of the carbonated agglomerates and the absorptive soda ash are set forth in Table I.

The term "bulk density" as utilized in the specification and in Table I is the apparent bulk density which is determined by weighing a given volume of soda ash whose bulk density is to be determined; the volume is measured with the material in a loosely-packed condition without packing or tamping to remove the voids between the particles. The weight of this volume of soda ash is then converted into its equivalent weight per one cubic foot of the loosely-packed material.

EXAMPLE 2

The same procedure and equipment was used in carrying out the present example except that 3,621 lbs. of carbonated agglomerates were produced in which the average $NaHCO_3:Na_2CO_3$ mole ratio was 0.83:1 instead of 0.92:1 as obtained in Example 1. The carbonated agglomerates were calcined in the fluid bed with combustion gases having a temperature of 540° C. and in which the bed temperature was 150° C. and an absorptive soda ash product was recovered. The superficial gas velocity was 1.0 feet/second in the bed. The percentage of oversized material (+20 mesh) from the carbonator was 7.3% while the fines (−100 mesh) generated in the fluid bed amounted to 7.0% of the soda ash fed to the agglomerating disk. The properties of the carbonated agglomerates and the absorptive soda ash are set forth in Table I.

EXAMPLE 3

Soda ash fines were agglomerated and carbonated in a manner similar to that given in Example 1 except that $CO_2$ flows were varied substantially from run to run, so as to yield carbonated agglomerates containing widely varying $NaHCO_3:Na_2CO_3$ mole ratios. Samples of these carbonated agglomerates were batch calcined in an oven at 150° C. and the physical properties of the resulting absorptive soda ash product were determined. The properties are shown in Table II.

EXAMPLE 4

Twenty-five lbs. of soda ash fines, identical to that used in Example 1, were fed to a rotary batch agglomerator 18 inches in diameter and 18 inches long which was rotated at 18 r.p.m. Water was sprayed into the agglomerator through a gun with a 2-fluid nozzle; air was used as the other fluid to atomize the spray. The bed temperature within the agglomerator was maintained within 40–50° C. during the agglomeration. Sufficient water was added so that wet agglomerates were obtained containing 25.0% by weight of water. The agglomerates were then fed to a rotating carbonation reactor and pure carbon dioxide was metered through the reactor at a rate of 2 s.c.f.m. for a period of seven minutes until the

mole ratio was 0.39:1. The temperature of the bed in the reactor rose from 40° C. to 70° C. due to the exothermic reaction. Thereafter the carbonated material was calcined at 220° C. to soda ash. The physical properties of the resulting absorptive soda ash product were determined and are set forth in Table III.

EXAMPLE 5

The procedure of Example 4 was repeated except that the total water content of the wet agglomerates was 26.4% by weight. Carbonation was conducted for 18 minutes to give a $NaHCO_3:Na_2CO_3$ mole ratio of 1.33:1; during the carbonation the temperature rose to 86° C. The physical properties of the resulting absorptive soda ash product are set forth in Table III.

EXAMPLE 6

The same procedure was used as in Example 4 except that agglomeration was carried out in a 14-inch Dravo-Lurgi pelletizing disk to yield wet agglomerates having a moisture content of 25.1% by weight based on the anhydrous soda ash feed, the carbonation reaction was carried out for 18 minutes and the $NaHCO_3:Na_2CO_3$ mole ratio was 0.98:1. The temperature of the bed in the carbonator rose from 40° C. to 91° C. due to the exothermic reaction. The physical properties of the resulting absorptive soda ash product are set forth in Table III.

EXAMPLE 7

The procedure of Example 6 was repeated except that the moisture content in the wet agglomerates was 24.3% by weight. The temperature of the bed in the carbonator rose from 33° C. to 69° C. due to the exothermic reaction which was carried out for ten minutes. The $NaHCO_3:Na_2CO_3$ mole ratio of the carbonated soda ash was 0.48:1. After calcining at 220° C. the physical properties of the resulting absorptive soda ash product were determined and are set forth in Table III.

EXAMPLE 7A

Example outside the scope of the invention

The procedure of Example 7 was repeated except that the percent moisture in the wet agglomerates was 27.9% by weight of the anhydrous soda ash feed, the carbon dioxide flow rate in the carbonator was 0.9 s.c.f.m. and carbonation was continued until the $NaHCO_3:Na_2CO_3$ mole ratio was 0.13:1. After calcination at 220° C., the physical properties of the resulting soda ash were determined and are set forth in Table III. These results show the poorer absorptivity obtained when using a mole ratio of $NaHCO_3:Na_2CO_3$ below 0.4:1.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

TABLE I.—PRODUCT PROPERTIES

| Example | Material | $NaHCO_3/Na_2CO_3$ mole ratio | Screen analysis (U.S. Sieve) percent by wt. | | | | | | Bulk density (lbs./cu. ft.) | Frangibility (percent) | Absorptivity (percent) |
|---|---|---|---|---|---|---|---|---|---|---|---|
| | | | +20 | +40 | +60 | +80 | +100 | −100 | | | |
| 1 | Carbonated agglomerates | 0.92 | 0.6 | 33.3 | 83.7 | 92.7 | 95.5 | 4.5 | 41.0 | 4.9 | 5–10 |
| | Absorptive soda ash | 0 | 0.1 | 36.9 | 79.2 | 91.7 | 96.7 | 3.3 | 32.6 | 6.1 | 25–30 |
| 2 | Carbonated agglomerates | 0.83 | 0.1 | 35.0 | 82.5 | 93.1 | 97.1 | 2.9 | 38.7 | 3.0 | 5–10 |
| | Absorptive soda ash | 0 | 0.4 | 34.1 | 81.2 | 92.6 | 96.7 | 3.3 | 32.0 | 6.4 | 25–30 |

TABLE II.—EFFECT OF $NaHCO_3$ CONTENT

| $NaHCO_3:Na_2CO_3$ mole ration in carbonated agglomerates | Absorptive soda ash product screen analyses (mesh size and percent by wt.) | | | | | | Frangibility (percent) | Absorptivity (percent) |
|---|---|---|---|---|---|---|---|---|
| | +20 | +40 | +60 | +80 | +100 | −100 | | |
| 0.06 | 0.0 | 29.4 | 75.1 | 88.3 | 92.1 | 7.9 | 26.9 | 10–15 |
| 0.16 | 0.0 | 25.2 | 74.0 | 86.3 | 91.5 | 8.5 | 38.2 | 15–20 |
| 0.26 | 0.1 | 40.0 | 83.6 | 93.2 | 95.7 | 4.3 | 31.1 | 20–25 |
| 0.53 | 0.3 | 28.9 | 81.1 | 93.2 | 96.9 | 3.1 | 12.6 | 20–25 |
| 0.56 | 0.3 | 31.9 | 82.5 | 94.9 | 97.0 | 2.2 | 10.2 | 20–25 |
| 0.62 | 0.3 | 28.7 | 80.1 | 92.6 | 96.4 | 3.6 | 7.1 | 20–25 |
| 0.67 | 0.4 | 33.8 | 84.8 | 96.3 | 98.5 | 1.5 | 7.1 | 25–30 |
| 0.72 | 0.4 | 39.9 | 86.5 | 95.6 | 97.9 | 2.1 | 7.5 | 25–30 |
| 0.78 | 0.3 | 37.9 | 83.2 | 94.2 | 97.0 | 3.0 | 8.2 | 25–30 |
| 1.63 | 0.2 | 35.6 | 78.9 | 93.5 | 96.8 | 3.2 | 7.7 | 25–30 |

TABLE III.—PROPERTIES OF CALCINED ABSORPTIVE SODA ASH

| Example No. | $NaHCO_3/Na_2CO_3$ mole ratio before calcining | Screen analysis (U.S. Sieve) percent by weight | | | | | Bulk density (lbs./cu. ft.) | Frangibility (percent) | Absorptivity (percent) | Porosity (percent) | Mid-range pore size (μ) | Percent of pores greater than 1 micron |
|---|---|---|---|---|---|---|---|---|---|---|---|---|
| | | +20 | +60 | +80 | +100 | −100 | | | | | | |
| 4 | 0.39 | 1.9 | 53.1 | 65.2 | 74.9 | 25.1 | 34.2 | 8.8 | 20–25 | 53.5 | 0.4–3.7 | 56 |
| 5 | 1.33 | 4.5 | 59.6 | 70.6 | 77.2 | 22.8 | 30.2 | 11.2 | 25–30 | 62.4 | 0.4–2.5 | 54 |
| 6 | 0.98 | 13.2 | 76.2 | 87.8 | 90.9 | 9.1 | 28.0 | 11.2 | 25–30 | 55.9 | 0.4–4.9 | 52 |
| 7 | 0.48 | 1.2 | 66.9 | 79.6 | 84.7 | 15.3 | 30.0 | 19.3 | 20–25 | 59.8 | 0.4–5.0 | 58 |
| 7A | 0.13 | 2.7 | 67.1 | 81.9 | 86.7 | 13.3 | 37.0 | | 15–20 | 36.6 | 0.2–1.8 | 38 |

What is claimed is:

1. Process for producing soda ash comprising contacting particles containing a member selected from the group consisting of sodium carbonate and sodium carbonate monohydrate with an aqueous medium and agglomerating the resulting mixture at temperatures of about 35 to about 109° C. so as to obtain wet agglomerates containing 20 to 28% by weight water, reacting the wet agglomerates with carbon dioxide gas in amounts sufficient to obtain carbonated agglomerates containing as an essential ingredient sodium sesquicarbonate, said carbonated agglomerates having an $NaHCO_3:Na_2CO_3$ mole ratio of about 0.4:1 to about 2:1, calcining the carbonated agglomerates to soda ash and recovering a free flowing, highly absorptive soda ash having a bulk density of below 40 pounds per cubic foot.

2. Process of claim 1 wherein said carbonated agglomerates contain, in addition to said sodium sesquicarbonate, a member selected from the group consisting of sodium carbonate monohydrate and sodium bicarbonate.

3. Process of claim 1 wherein said carbonated agglomerates have an $NaHCO_3:Na_2CO_3$ mole ratio of about 0.7:1 to 1:1.

4. Process of claim 1 wherein said wet agglomerates have a water content of about 23 to about 25% by weight.

5. Process of claim 1 wherein said aqueous medium is selected from the group consisting of water and aqueous solutions containing sodium cations and anions selected from the group consisting of carbonate and bicarbonate.

6. Process of claim 1 wherein the partial pressure of $CO_2$ is at least about 0.5 atmosphere.

7. Process of claim 1 wherein the wet agglomerates are reacted with $CO_2$ at a temperature of from about 35° C. to about 90° C.

8. Process of claim 1 wherein the absorptive soda ash product has a bulk density of about 28 to about 35 pounds per cubic foot.

References Cited

UNITED STATES PATENTS

| | | | |
|---|---|---|---|
| 3,479,133 | 11/1969 | Warzel | 23—63 |
| 1,583,661 | 5/1926 | Cocksedge | 23—64 |
| 636,448 | 11/1899 | Patten | 23—64 |
| 574,089 | 12/1896 | Hawliczen | 23—64 |
| 1,748,739 | 2/1930 | Sundstrom. | |

EARL C. THOMAS, Primary Examiner

G. O. PETERS, Assistant Examiner